United States Patent Office 3,331,843
Patented July 18, 1967

3,331,843
1-SUBSTITUTED-4-SUBSTITUTED AMINO-
ALKYLENE PIPERAZINES
Andrew Stephen Tomcufcik, Old Tappan, N.J., Paul
Frank Fabio, Pearl River, N.Y., and Arlene May Hoffman, Park Ridge, N.J., assignors to American Cyanamid Company, Stamford, Conn., a corporation of Maine
No Drawing. Filed June 29, 1965, Ser. No. 468,142
17 Claims. (Cl. 260—268)

This application is a continuation-in-part of application Ser. No. 270,536 filed Apr. 4, 1963, and now abandoned.

This invention relates to new organic compounds. More particularly, it relates to 1-substituted-4-substituted aminopropylene piperazines and methods of preparing the same.

The novel piperazines of the present invention may be illustrated as follows:

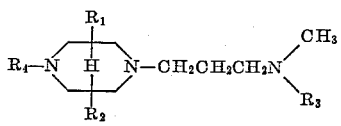

wherein $R_1$ and $R_2$ are selected from the group consisting of hydrogen and lower alkyl, $R_3$ is selected from the group consisting of alkyl of 1 to 12 carbon atoms and aralkyl and $R_4$ is a heterocyclic radical selected from the group consisting of quinolyl, methoxyquinolyl, haloquinolyl, trifluoromethylquinolyl, quinolyl N-oxide, quinozolyl, pyridyl, pyridyl N-oxide, nitropyridyl, benzamidopyridyl, thiazolyl, nitrothiazolyl, thiadiazolyl, nitrothiadiazolyl, pyrimidyl, halopyrimidyl, nitropyrimidyl, pyrazinyl, halopyrazinyl, acetamidopyrimidyl, benzoxazolyl, benzothiazolyl, ethoxybenzothiazolyl, phenylimidazothiadiazolyl, acridinyl, phenanthridinyl, purinyl and triazinyl and therapeutically acceptable acid addition and quaternary salts thereof.

The heterocyclic compounds useful in preparing the products of the present invention are, for example, 2-halopyridines, 4-halopyridines, 5-nitro-2-halopyridines, 2,5-dihalopyrimidines, 2-halothiazoles, 5-nitro-2-halothiazoles, 2-halobenzothiazoles, 2 - halo-6 - alkoxybenzothiazoles, 2-halobenzoxazoles, 2-halo - 5 - nitro-1,3,4-thiadiazoles, 4,7-dihaloquinolines, 2-haloquinolines, 4-halo-6-methoxyquinolines, 6-halopurines, 2-halopyrazines, 4-haloquinazolines, 2-halo-6 - phenylimidazo[2,1-b]-1,3,4-thiadiazoles, and the like.

More specifically the heterocyclic radicals found useful in the compounds of the present invention are thiadiazolyl, nitrothiazolyl, benzoxazolyl, quinolyl-1-oxide, benzothiazolyl, ethoxybenzothiazolyl, phenylimidazothiadiazolyl, acridinyl, phenanthridinyl, purinyl and triazinyl and therapeutically acceptable acid addition and quaternary salts thereof.

The free bases of the above compounds are, in general, oils or lower melting solids, relatively insoluble in water but soluble in lower alkanols, benzene, toluene, acetone, chloroform or the like. The salts of the above compounds are characteristically soluble in water and other hydroxylated solvents and are usually insoluble in non-polar solvents.

The new compounds of the present invention may be prepared by several methods, the more important of which are as follows.

(1) A number of the compounds can be prepared by reacting a haloheterocyclic compound with a 1-(3-disubstituted aminoproylene)piperazine as follows:

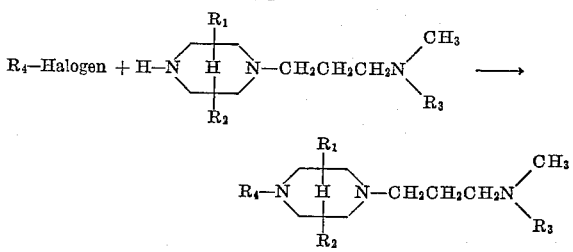

In the above reaction, $R_1$, $R_2$, $R_3$ and $R_4$ are as hereinbefore defined. The above reaction is usually carried out in a solvent such as, for example, a β-alkoxy alkanol, a lower alkanol, tetrahydrofuran, phenol or the like. The reaction is usually carried out by heating the reaction mixture in the presence of an acid acceptor such as an alkali metal bicarbonate, triethylamine or the like.

(2) The present compounds are also prepared by reacting a heterocyclic substituted piperazine with a ω-disubstituted aminopropylene halide. This reaction may be illustrated as follows:

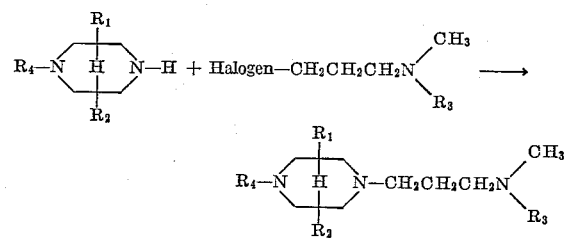

In the above reaction, $R_1$, $R_2$, $R_3$ and $R_4$ are as hereinbefore defined. The above reaction is usually carried out in a solvent such as a lower alkanol or the like by heating the reaction mixture in the presence of an acid acceptor such as lower alkoxide or a carbonate or bicarbonate.

(3) The present compounds can be prepared by treating a 1-heterocyclic - 4 - (ω-hydroxypropylene)piperazine with a halogenating or sulfonating agent such as, for example, thionyl chloride, phosphorous oxychloride, phosphorus oxybromide, phosphorus bromide, alkyl sulfonyl chloride, aryl sulfonyl chloride or the like and subsequently reacting the intermediate 1-heterocyclic-4-halopropyl-, alkylsulfonyloxyproyl-, or arylsulfonyloxypropyl piperazine with a primary or secondary amine in the presence of an acid acceptor. This reaction may be illustrated as follows:

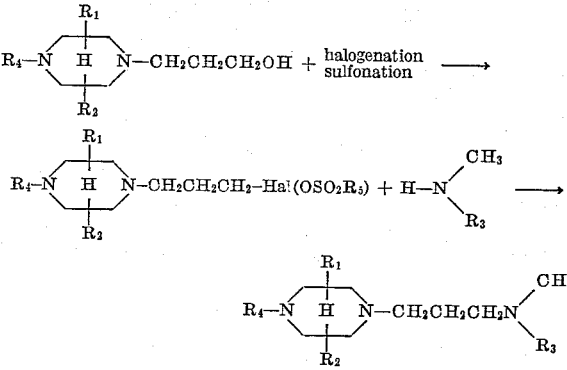

wherein $R_1$, $R_2$, $R_3$ and $R_4$ are as defined above and $R_5$ is alkyl or aryl. The above halogenation or sulfonation is usually carried out in a solvent and the subsequent amination is preferably carried out in a solvent in the presence of an acid acceptor.

(4) The compounds of the present invention can be prepared by reacting a heterocyclic amine with a substituted diethylaminopropyl amine which can be illustrated as follows:

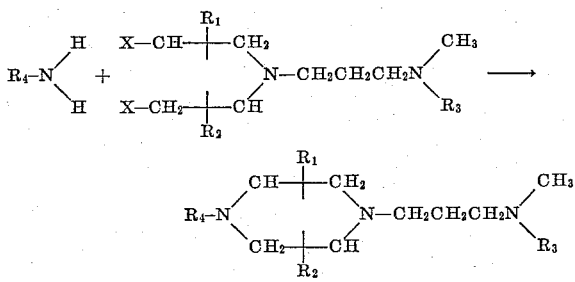

wherein $R_1$, $R_2$, $R_3$ and $R_4$ are as hereinbefore defined and X is halogen, alkylsulfonyloxy or arylsulfonyloxy. The reaction is preferably carried out in a solvent such as a lower alkanol or β-alkoxyalkanol by heating the reaction mixture.

(5) A hetero - 4 - (ω - haloethyl carbonyl)piperazine is treated with a primary or secondary amine

wherein $R_3$ is as defined hereinbefore and the resulting product is then reduced by suitable procedures to give compounds as described in paragraph (1).

(6) The compounds of the present invention may be prepared by the reduction of intermediates of the general structure:

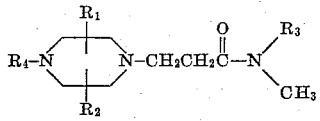

wherein $R_1$, $R_2$, $R_3$ and $R_4$ are as hereinbefore defined.

The compounds of the present invention are active in inhibiting the growth of protozoa (e.g., Trypanosomiasis or "sleeping sickness"). The compound 1-(7-chloro-4-quinolinyl)-4-(3-dimethylaminopropyl)piperazine for example has been found to be active against experimental infections with *Trypanosoma cruzi* in mice. *Trypanosoma cruzi*: (Chagas' Disease) in mice. It has also shown activity against experimental *Plasmodium berghei* infections in mice.

In testing the compounds of the present invention 7- or 8-week-old female mice, weighing about 17 to 26 grams, were inoculated subcutaneously with *T. cruzi*. The unit inocula contained approximately 50,000 parasites according to counts of pooled diluted donor blood made in hemacytometers chambers. Deaths among untreated and treated animals were recorded daily, with postinoculation periods ranging from one month to more than a year. The rapid graphic method of Litchfield (J. Pharmacol. and Exp. Therap. 97 339–408) was employed for the solution of time-percent effect curves involving groups of 7 to 20 variates. The application of this approximate statistical method to interpretations of mortality data in experimenal infections with *T. cruzi* has been discussed by Hewitt et al. (J. Parasitol. 49:22–30).

Drug-diet treatment was employed for screening candidate compounds and for preliminary evaluation studies, primarily because of the simplicity of this method for administering compounds to large groups of animals for one week or longer. Appropriate amounts of the compounds, either in terms of the entire structure or the base content, were added to ground feed and were tumbled in a mechanical mixing machine for 1½ hours. The diet mixtures were placed in metal hoppers and were covered with metal stall-like partitions, allowing ad libitum feeding for groups of 7 to 10 mice per cage. An automatic timing switch provided alternate periods (12 hours) of light and darkness in the room where the mice were caged. Mean mouse weights were determined at three or more intervals during the period of medication. Approximate daily intakes per mouse, based on group consumption of feed throughout the treatment period, were calculated ultimately in terms of base content for each candidate compound.

Parenteral treatment, or oral treatment by gavage, involving aqueous solutions of the compound (unit volumes, 0.2 or 0.4 ml.) were utilized in some tests as indicated. In some cases where treatment by gavage was employed, the mice were isolated in individual cages. Such caging procedures facilitated record keeping on individual mice, and possibly helped reduce the transmission of natural infections of unknown etiology.

The principal criterion employed for measuring chemotherapeutic activity in initial screening and evaluation tests was the prolongation of survival times in relation to appropriate untreated control infections. Weight changes and parasite counts (peripheral blood) were employed as supplementary criteria of activity in later evaluations. Parasite counts were made either from Giesma-stained thick blood films or from wet-film preparations. For the former method, uniform samples (5 microliters) of blood were withdrawn from the tails of mice in microcapillary pipettes and were spread over an etched grid (approximately 10 mm. square) placed under the specimen slide. Beginning in the center of the stained film and proceeding horizontally and vertically in relatively uniform patterns for all samples, from 10 to 100 fields (depending upon parasite density) were examined under an oil immersion objective (100×) and 10× oculars. Wet-film counts were made similarly from 2-microliter samples of blood placed under 22-mm. square cover slips (magnification: 270×). All parasite counts were expressed ultimately in terms of 100 microscopic fields. These types of peripheral blood examinations have relative, qualitative value in estimating degrees of parasitemia, but they offered time saving advantages when large numbers of animals were involved. Generally, the frequency distributions of parasite counts among untreated animals or animals treated similarly were highly skewed, and medians were considered more representative than means for the calculation of midpoint values. The absence of parasites in 100 microscopic fields was not interpreted as unequivocal evidence of their complete disappearance from the peripheral blood.

The following table summarizes the testing results obtained with representative compounds.

TABLE

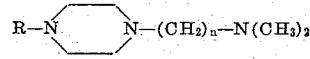

| R | n | Dosage of Free Base (mg./kg./day) | Median Survival Time (days) |
|---|---|---|---|
| 7-chloro-2-quinolyl | 3 | 9 | >30 |
| Do | 2 | 71 | 16.5 |
| 2-pyridyl | 3 | 25 | 19 |
| Do | 2 | 50 | 15 |
| 4-pyridyl | 3 | 15 | >30 |
| 5-nitro-2-pyridyl | 3 | 32 | 29 |
| 2-benzothiazolyl | 3 | 42 | >30 |
| 5-nitro-2-thiazolyl | 3 | 32 | >30 |
| 5-benzamido-2-pyridyl | 3 | 6 | >91 |
| 7-trifluoromethyl-4-quinolyl | 3 | 17 | >30 |
| 4-quinolyl-1-oxide | 3 | 17 | >30 |
| 2-quinolyl | 3 | 26 | 29 |
| Controls | | | 13–16 |

The compositions of the present invention are administered to warm-blooded animals in a dosage which may vary from 10 mg. to 1000 mg. The compositions may be in the form of tablets, pills, capsules, powders, granules, sterile parenteral solutions or suspensions, oral solutions or suspensions and the like. For preparing solid compositions such as tablets, the principal active ingredient is mixed with conventional tableting ingredients such as corn starch, lactose, sucrose, sorbitol, talc, stearic acid, magnesium stearate, dicalcium phosphate, gums and functionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel composition of the present invention may be incorporated for administration include aqueous solutions, suitably flavored syrups, aqueous or oil suspensions, flavored emulsions with edible oils such as cottonseed oil, sesame oil, coconut oil, peanut oil and the like, as well as elixirs and similar pharmaceutical vehicles. Suitable dispersing or suspending agents for aqueous suspensions include synthetic and natural gums such as tragacanth, acacia, alginate, dextran, sodium carboxymethylcellulose, methylcellulose, polyvinylpyrrolidone, gelatin and the like. Sterile suspensions or solutions are required for parenteral use. Isotonic preparations containing suitable preservatives are also highly desirable for injection use.

The term unit dosage form as used in the specification and claims refers to physically discrete units suitable as unitary dosages for warm-blooded animals, each unit containing a predetermined quantity of active material calculated to produce the desired therapeutic effect in association with the required pharmaceutical diluent, carrier or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use in warm-blooded animals, these being features of the present invention. Examples of suitable oral unit dosage forms in accord with this invention are tablets, capsules, pills, powder packets, granules, wafers, cachets, teaspoonsfuls, dropperfuls, ampules, vials, segregated multiples of any of the foregoing and other forms as herein described.

The following examples describe in detail the preparation of representative substituted piperazines of the present invention.

EXAMPLE I

*Preparation of 1-(7-chloro-4-quinolyl)-4-(3-dimethylaminopropyl)piperazine trihydrochloride hydrate*

To a mixture of 8.6 g. (50 mmol.) of 1-(3-dimethylaminopropyl)piperazine and 4.2 g. (50 mmol.) of solid sodium bicarbonate in 200 ml. of methyl Cellosolve is added 10.5 g. (53 mmol.) of 4.7-dichloroquinoline. The mixture is refluxed for 16.5 hours, cooled, filtered and the filtrate stripped of solvent at the water pump. The residual oil in 100 ml. of methanol is treated with 37.5 ml. of 8 N methanolic hydrogen chloride. After adding enough ether to precipitate all of the product, the mixture is filtered. The crude product is treated with activated charcoal and recrystallized from methanol to give the analytically pure hygroscopic product, 7.3 g. (32.3%) melting point 263° (dec.).

EXAMPLE II

*Preparation of 1-(7-chloro-4-quinolyl)-4-(3-dimethylaminopropyl)piperazine trihydrochloride*

A mixture of 19.8 g. (0.1 mole) of 4,7-dichloroquinoline, 17.1 g. (0.1 mole) of 1-(3-dimethylaminopropyl)piperazine and 88 ml. (ca 1 mole) of phenol is stirred at 150–160° for 2½ hours in a 1 liter 3-necked flask equipped with a Teflon paddle stirrer and an immersion thermometer. The reaction mixture is cooled to about 70° C. and poured into 300 ml. of 2 N hydrochloric acid and cracked ice. The resulting two-liquid phased mixture is extracted with three 200 ml. portions of ether. The aqueous layer is treated with a solution of 40 g. of potassium hydroxide in 100 ml. of water followed by the addition of enough potassium hydroxide pellets to bring the Ph to 13.5. The resulting mixture containing an insoluble oil is extracted with three 200 ml. portions and two 100 ml. portions of chloroform. The extracts are combined, washed with three 100 ml. portions of water, dried over anhydrous magnesium sulfate, and stripped of solvent at the water pump to give 25.9 g. of a residual brown oil. The oil in 200 ml. of ethanol is treated with activated charcoal, filtered, and the filtrate is treated with 68.5 ml. of 7.13 N hydrogen chloride in isopropanol. The mixture is cooled and filtered to give 32.2 g. of crude product, melting point 264° C. (dec.). The solid is recrystallized from 100 ml. of methanol and from a mixture of 150 ml. of isopropanol and 220 ml. of methanol to give 21.6 g. (48.9%) of pale yellow product, melting point 277° C. (dec.).

The trimaleate salt of the free base can be prepared from the base and maleic acid in methanolic solution, melting point 159°–161° C. with decomposition.

EXAMPLE III

*Preparation of 1-(3-dimethylaminopropyl)-4-(5-nitro-2-pyridyl)piperazine dihydrochloride*

This compound is prepared by the method of Example I, an equimolar quantity of 2-chloro-5-nitropyridine replacing the 4,7-dichloroquinoline. The compound is pure yellow, hygroscopic, product melting at 260° C. with decomposition.

EXAMPLE IV

*Preparation of 1-(3-dimethylaminopropyl)-4-(5-nitro-2-thiazolyl)piperazine dihydrochloride*

This compound is prepared by the method of Example I, an equimolar quantity of 2-bromo-5-nitrothiazole replacing the 4,7-dichloroquinoline. The compound is a pure yellow solid, decomposing at 260–270° C.

EXAMPLE V

*Preparation of 1-(3-dimethylaminopropyl)-4-(6-purinyl)piperazine*

This compound is prepared by the method of Example I, an equimolar quantity of 6-chloropurine replacing the 4,7-dichloroquinoline. The compound is a white crystalline solid melting at 218–220° C.

EXAMPLE VI

*Preparation of 1-(3-dimethylaminopropyl)-4-(2-pyridyl)piperazine trihydrochloride*

This compound is prepared by the method of Example I, an equimolar quantity of 2-bromopyridine replacing the 4,7-dichloroquinoline. The compound is a white crystalline solid melting at 258–265° C. with decomposition.

EXAMPLE VII

*Preparation of 1-(2-benzothiazolyl)-4-(3-dimethylaminopropyl)piperazine*

This compound is prepared by the method of Example I, an equimolar quantity of 2-chlorobenzothiazole replacing the 4,7-dichloroquinoline. The compound is a white crystalline solid melting at 92–94° C.

EXAMPLE VIII

*Preparation of 1-(7-chloro-4-quinolyl)-4-(3-benzylmethylaminopropyl)piperazine trimaleate*

This compound is prepared by the general method of Example I, an equimolar quantity of 1-(3-benzylmethylaminopropyl)piperazine replacing the 1-(3-dimethylaminopropyl)piperazine. The compound is isolated as the trimaleate, melting at 133–135° C. with decomposition.

EXAMPLE IX

*Preparation of 1-(3-dimethylaminopropyl)-4-(5-nitro-1,3,4-thiadiazole-2-yl)piperazine dimaleate*

The subject compound is prepared essentially by the procedure of Example I, an equimolar quantity of 2-bromo-5-nitro-1,3,4-thiadiazole replacing the 4,7-dichloroquinoline. In this case, ethanol replaces methyl cellosolve as the solvent. The compound is a yellow solid melting at 159–162° C. with decomposition.

EXAMPLE X

*Preparation of 1-(5-bromo-2-pyrimidinyl)-4-(3-dimethylaminopropyl)piperazine dihydrochloride*

The subject compound is prepared essentially by the procedure of Example I, an equimolar quantity of 5-bromo-2-chloropyrimidine replacing the 4,7-dichloroquinoline. In this case, ethanol replaces methyl cellosolve as the solvent. The compound is a white solid melting above 290° C. with decomposition.

EXAMPLE XI

*Preparation of 1-(3-dimethylaminopropyl)-4-(2-quinolyl-piperazine trihydrochloride*

The subject compound is prepared essentially by the procedure of Example I, an equimolar quantity of 2-chloroquinoline replacing the 4,7-dichloroquinoline. The product is a white solid melting at 274–280° C. with decomposition.

EXAMPLE XII

*Preparation of 1-(2-benzoxazoyl)-4-(3-dimethylaminopropyl)piperazine dihydrochloride*

The subject compound is prepared essentially by the method of Example I, an equimolar quantity of 2-chlorobenzoxazole replacing the 4,7-dichloroquinoline. The compound is a white solid melting at 275–295° C. with decomposition.

EXAMPLE XIII

*Preparation of 1-(3-dimethylaminopropyl)-4-(4-pyridyl)-piperazine trimaleate*

This compound is prepared essentially by the procedure of Example I, an equimolar quantity of 4-chloropyridine replacing the 4,7-dichloroquinoline. The compound is a white crystalline solid melting at 177–179° C.

EXAMPLE XIV

*Preparation of 1-(3-dimethylaminopropyl)-4-(6-methoxy-4-quinolyl-piperazine trimaleate*

A mixture of 0.97 g. (0.005 mole) of 4-chloro-6-methoxyquinoline and 1.8 g. (0.010 mole) of 1-(3-dimethylaminopropyl)piperazine is heated in an oil bath slowly, being heated from room temperature to 195° C. during ninety minutes. An exothermic reaction occurred at about 155°. The cooled reaction mixture is triturated with acetone and filtered. The acetone filtrate is taken down under reduced pressure to an oil, which is dissolved in 125 ml. of benzene. The benzene solution is washed with a little water, dried over magnesium sulfate and the benzene removed under reduced pressure. The residual pale yellow oil is dissolved in acetone and added to a solution of 5.0 g. (0.043 mole) of maleic acid in 100 ml. of acetone. The resultant precipitate is collected and recrystallized from ethanol to give the pure compound, melting at 177–180° C.

EXAMPLE XV

*Preparation of 1-(3-dimethylaminopropyl)-4-(2-pyrazinyl)piperazine dimaleate*

This compound is prepared by the method described in Example XIV except that an equimolar quantity of 2-chloropyrazine instead of the 4-chloro-6-methoxyquinoline is used. The compound is a white crystalline solid melting at 182–184° C.

EXAMPLE XVI

*Preparation of 1-(3-dimethylaminopropyl)-4-(4-quinazolyl)-piperazine trimaleate*

This compound is prepared by the method of Example I, an equimolar quantity of 4-chloroquinazoline replacing the 4,7-dichloroquinoline. The compound is a white solid melting at 152° C. with decomposition.

EXAMPLE XVII

*Preparation of 1-(3-dimethylaminopropyl)-4-(2-thiazolyl)-piperazine dimaleate*

This compound is prepared by the method of Example XIV, an equimolar quantity of 2-bromothiazole replacing the 4-chloro-6-methoxyquinoline. The compound is a white solid melting at 164–165° C.

EXAMPLE XVIII

*Preparation of 1-(3-dimethylaminopropyl)-4-(6-phenyl-imidazo[2,1-b] - 1,3,4 - thiadiazol - 2 - yl)piperazine dimaleate*

This compound is prepared by the method of Example I, an equimolar quantity of 2-bromo-6-phenylimidazo[2,1-b]-1,3,4-thiadiazole replacing the 4,7-dichloroquinoline. This compound is a white solid melting at 175–178° C. with decomposition.

EXAMPLE XIX

*Preparation of 1-(3-dimethylaminopropyl)-4-(6-ethoxy-2-benzothiazolyl)piperazine*

This compound is prepared by the procedure of Example XIV, an equimolar quantity of 2-chloro-6-ethoxybenzothiazole replacing the 4-chloro-6-methoxyquinoline. The compound is a white solid melting at 90–92° C.

EXAMPLE XX

*Preparation of 1-(2-benzothiazolyl)-trans 2,5-dimethyl-4-(3-dimethylaminopropyl)piperazine*

This compound is prepared by the method of Example VII, an equimolar quantity of trans 2,5-dimethyl-1-(3-dimethylaminopropyl)piperazine replacing the 1-(3-dimethylaminopropyl)piperazine of Example VII. The product of the example is recovered.

EXAMPLE XXI

*Preparation of 1-(7-chloro-4-quinolyl)piperazine*

A mixture of 99.0 g. (0.50 mole) of 4,7-dichloroquinoline, 172.0 g. (2.0 moles) of anhydrous piperazine and 440 ml. (5.0 moles) of phenol (100%) is heated with stirring at 150–160° C. for 2½ hours in an oil bath at 195–200° C. The mixture is cooled to about 60° C. and poured into 2 liters of 2 N hydrochloric acid. The resulting two-liquid layered mixture is extracted with ether, 2× 250 ml. portions. The aqueous layer is again extracted with ether, 2× 500 ml. portions. The resulting aqueous layer is combined with the aqueous layer obtained from the lower liquid layer which separated after combining all ether extracts, is added to 1 liter of water containing 20 ml. of concentrated hydrochloric acid and is filtered. The combined aqueous layer (3260 ml.) is treated with a solution of 326 g. (5.8 moles) of potassium hydroxide in 1800 ml. of aqueous solution. An oil separated out of the alkaline (pH 10) solution. After adjusting the pH to 13.5 by the addition of potassium hydroxide pellets, the oil that separated out is extracted from the mixture with benzene, 4× 500 ml. portions. The benzene extract is washed with water, dried over anhydrous potassium carbonate and magnesium sulfate and stripped of solvent at the water pump to give the solid, pale yellow product, 85.0 g. (69%), melting point 111–113°. Analytically pure product (pale yellow) melting at 113.5–114.5° C. is obtained by recrystallization from cyclohexane.

The salts of the product that are prepared are: dihydrobromide, melting point 266° C. (dec.) yellow solid; dihydrochloride·½ $H_2O$, melting point 280° (dec.) yellow solid; monomaleic acid salt, melting point 167° C. (dec.) yellow solid.

EXAMPLE XXII

*Preparation of 1-(3-dimethylaminopropyl)piperazine*

A mixture of 500 g. (5.8 moles) of piperazine, 460 g. (2.9 moles) of 3-dimethylaminopropyl chloride hydrochloride, 550 g. (6.55 moles) of sodium bicarbonate, and 2.5 liters of ethanol are stirred at reflux for seven hours. After cooling to room temperature, the inorganic salts are filtered off and washed with 500 ml. of ethanol. The combined filtrate and wash are concentrated to constant volume on the steam bath. The residual oil is mixed with 500 ml. of methyl Cellosolve and taken down to constant volume in vacuo (water pump) on the steam bath. The residual oil is then distilled at 6 mm. pressure. After a slight forerun, the bulk of the pure product comes over at 96–101° C., yield 207 g., $n_D^{26}$ 1.4750.

The subject compound may also be prepared by the acid hydrolysis of ethyl 4-(3-dimethylaminopropyl)-piperazine 1-carboxylate followed by neutralization with an alkali. The properties of the material prepared by this procedure are identical with those described above.

EXAMPLE XXIII

*Preparation of trans 2,5-dimethyl-1-(3-dimethylaminopropyl)-piperazine trihydrochloride*

This compound is prepared by the method of Example XXIV, trans 2,5-dimethylpiperazine replacing the piperazine. The compound is a white solid melting at 285–286° C. with decomposition.

EXAMPLE XXIV

*Preparation of 1-(5-benzamido-2-pyridyl)-4-3-dimethylaminopropyl)piperazine dimaleate*

A solution of 14.7 g. of 1-(3-dimethylaminopropyl)-4-(5-nitro-2-pyridyl)piperazine (Example III) in a mixture of 100 ml. of concentrated hydrochloric acid and 100 ml. of water is stirred as 45 g. of stannous chloride dihydrate is added slowly during fifteen minutes. An exothermic reaction occurs. The solution is stirred for sixteen hours, the precipitate collected and washed with acetone and ether. The precipitate is then added to 100 ml. of cold 40% aqueous sodium hydroxide solution, 15 ml. of benzoyl chloride added, and the mixture then stirred for one hour. The insolubles are collected and extracted with 250 ml. of boiling chloroform. The chloroform extract is concentrated in vacuo, leaving the crude free base. It is converted to the subject compound by addition to 200 ml. of acetone containing 10 g. of maleic acid. Recrystallization from an ethanol-methanol mixture gives the pure compound, melting at 164–165° C. with decomposition.

EXAMPLE XXV

*Preparation of 1-(9-acridinyl)-4-(3-dimethylaminopropyl)-piperazine*

This compound is prepared by the method of Example XIV, an equimolar quantity of 9-chloroacridine replacing the 4-chloro-6-methoxyquinoline. The product of the example is recovered. The melting point of this compound is 100°–102° C.

EXAMPLE XXVI

*Preparation of 1-(4,6-diamino-1,3,5-triazin-2-yl)-4-(3-dimethylaminopropyl)piperazine*

The subject compound is prepared essentially by the procedure of Example XIV, an equimolar quantity of 2-chloro-4,6-diamino-1,3,5-triazine replacing the 4-chloro-6-methoxyquinoline. The product of the example is recovered. The melting point of this compound is 99°–103° C.

EXAMPLE XXVII

*Preparation of 1-(3-dimethylaminopropyl)-4-(6-phenanthridinyl)piperazine trimaleate*

The subject compound is prepared essentially by the procedure of Example XIV, an equimolar quantity of 6-chlorophenanthridine replacing the 4-chloro-6-methoxyquinoline. The compound is a white crystalline solid melting at 155–157° C.

EXAMPLE XXVIII

*Preparation of 1-(3-dimethylaminopropyl)-4-(1,3,4-thiadiazol-2-yl)piperazine dimaleate*

The subject compound is prepared essentially by the procedure of Example XIV, an equimolar quantity of 2-bromo-1,3,4-thiadiazole replacing the 4-chloro-6-methoxyqunoline. The subject compound is recovered, M.P. 164°–166° C.

EXAMPLE XXIX

*Preparation of 1-(3-dimethylaminopropyl)-4-(4-quinolyl-1-oxide)-piperazine trimaleate*

This compound is prepared by the general method of Example I, an equimolar quantity of 4-chloroquinoline-1-oxide, replacing the 4,7-dichloroquinoline. The compound is isolated as the trimaleate, M.P. 118°–120° C.

EXAMPLE XXX

*Preparation of 1-(3-dimethylaminopropyl)-4-(5-benzamido-2-pyridyl)piperazine dimaleate*

A solution of 14.6 grams of 1-(3-dimethylaminopropyl)-4-(5-nitro-2-pyridyl)piperazine (Example III) is dissolved in 100 ml. of water containing 25 ml. of concentrated hydrochloric acid. The solution is stirred at room temperature as 45 grams of solid stannous chloride dihydrate is added in portions during fifteen minutes. The reaction mixture is then stirred at room temperature for sixteen hours, cooled to 5° C., filtered, and the precipitate dried. The solid is added to 100 ml. of cold 40% aqueous sodium hydroxide soluton, stirred, and treated with 15 ml. of benzoyl chloride. The mixture is stirred for one hour at room temperature and filtered. The precipitate is extracted with successive portions of 100 ml. of acetone, ether, and methanol. The combined extracts are concentrated to dryness under reduced pressure. The residual solid is extracted with 250 ml. of hot chloroform.

Removal of the chloroform gives the free base of the title compound, which is converted to the dimaleate salt by an acetone solution of maleic acid. The compound melts at 164°–165° C. with decomposition.

EXAMPLE XXXI

*Preparation of 1-(3-dimethylaminopropyl)-4-(5-acetamido-2-pyrimidyl)piperazine dimaleate*

A solution of 10.6 g. of 1-(3-dimethylaminopropyl)-4-(5-nitro-2-pyrimidyl)piperazine (Example XXXV) in 125 ml. of ethyl acetate is reduced with hydrogen in the presence of 550 mg. of platinum oxide. The reaction mixture is filtered and the filtrate treated with 15 ml. of acetic anhydride. The solution is refluxed for fifteen minutes, and then concentrated under reduced pressure. The residual free base of the compound of the example is treated with an acetone solution of maleic acid to give the dimaleate salt melting at 172°–174° C.

EXAMPLE XXXII

*Preparation of 1-(3-dimethylaminopropyl)-4-(4-pyridyl-1-oxide)piperazine trimaleate*

This compound is prepared by the method of Example I, an equivalent of 4-chloropyridine-1-oxide replacing the 4,7-dichloroquinoline. The compound is isolated as the trimaleate melting at 154–156° C. with decomposition.

EXAMPLE XXXIII

*Preparation of 1-(3-dimethylaminopropyl)-4-(3-nitro-4-pyridyl)piperazine trimaleate*

The compound is prepared by the method of Example I, an equivalent of 4-chloro-3-nitropyridine replacing the 4,7-dichloroquinoline. The compound is isolated as the trimaleate melting at 137°–141° C. with decomposition.

EXAMPLE XXXIV

*Preparation of 1-(3-dimethylaminopropyl)-4-(6-nitro-4-quinolyl)piperazine trimaleate*

This compound is prepared by the method of Example I, an equivalent of 4-chloro-6-nitroquinoline replacing the 4,7-dichloroquinoline. The compound is isolated as the trimaleate melting at 187°–188° C.

EXAMPLE XXXV

*Preparation of 1-(3-dimethylaminopropyl)-4-(5-nitro-2-pyrimidyl)piperazine*

This compound is prepared by the method of Example I, an equivalent quantity of 2-chloro-5-nitropyrimidine replacing the 4,7-dichloroquinoline. The compound melts at 85°–87° C.

EXAMPLE XXXVI

*Preparation of 1-(3-dimethylaminopropyl)-4-(7-trifluoromethyl-4-quinolyl)piperazine trimaleate*

This compound is prepared by the method of Example I, an equivalent quantity of 4-chloro-7-trifluoromethylquinoline replacing the 4,7-dichloroquinoline. The compound is isolated as the trimaleate melting at 168°–170° C.

EXAMPLE XXXVII

*Preparation of 1-(3-dimethylaminopropyl)-4-(6-chloro-4-quinolyl)piperazine trimaleate*

The above compound is prepared by the method of Example I, an equimolar quantity of 4,6-dichloroquinoline replacing the 4,7-dichloroquinoline. The compound is isolated as the trimaleate melting at 166°–169° C.

EXAMPLE XXXVIII

*Preparation of 1-(3-dimethylaminopropyl)-4-(4-quinolyl)piperazine trimaleate*

The above compound is prepared by the method of Example I, an equimolar quantity of 4-chloroquinoline replacing the 4-7-dichloroquinoline. The compound is isolated as the trimaleate melting at 158°–159° C.

EXAMPLE XXXIX

*Preparation of 1-[3-(N-methyl-n-dodecylamino)propyl]-4-(5-nitro-2-pyridyl)piperazine dimaleate*

The compound is prepared by the procedure of Example III, an equimolar quantity of 1-[3-(N-methyl-n-dodecylamino)propyl]piperazine replacing the 1-(3-dimethylaminopropyl)piperazine. The compound is a bright yellow solid easily soluble in water and polar solvents.

EXAMPLE XL

*Preparation of 1-[3-(N-methyl-n-butylamino)propyl]-4-(2-benzothiazolyl)piperazine dimaleate*

The compound is prepared essentially by the procedure of Example VII, an equimolar quantity of 1-[3-(N-methyl-n-butyl)propyl]piperazine replacing the 1-(3-dimethylaminopropyl)piperazine. The compound is a white solid easily soluble in water.

EXAMPLE XLI

*Preparation of 1-(6-chloro-2-pyrazinyl)-4-(3-dimethylaminopropyl)piperazine dimaleate*

This compound is prepared by the method described in Example I except that an equimolar quantity of 2,6-dichloropyrazine is used instead of the 4,7-dichloroquinoline.

We claim:

1. A compound selected from those of the formula:

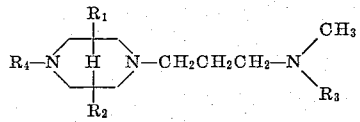

wherein $R_1$ and $R_2$ are selected from the group consisting of hydrogen and lower alkyl, $R_3$ is selected from the group consisting of hydrogen, alkyl of 1 to 12 carbon atoms and benzyl and $R_4$ is a heterocyclic radical selected from the group consisting of quinolyl, methoxyquinolyl, haloquinolyl, trifluoromethylquinolyl, quinolyl N-oxide, quinazolyl, pyridyl, pyridyl N-oxide, benzamidopyridyl, nitropyridyl, thiadiazolyl, nitrothiazolyl, pyrimidyl, halopyrimidyl, nitropyrimidyl, acetamidopyrimidyl, pyrazinyl, halopyrazinyl, benzoxazolyl, benzothiazolyl, ethoxybenzothiazolyl, phenylimidazothiadiazolyl, and purinyl; therapeutically acceptable acid addition salts and quaternary salts.

2. A compound of the formula:

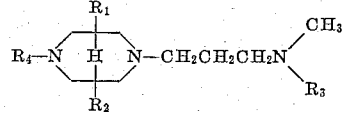

wherein $R_1$ and $R_2$ are hydrogen, $R_3$ is lower alkyl and $R_4$ is pyridyl.

3. The compound 1-(7-chloro-4-quinolyl)-4-(3-dimethylaminopropyl)piperazine.
4. The compound 1-(3-dimethylaminopropyl) - 4 - (5-nitro-2-pyridyl)piperazine.
5. The compound 1-(3-dimethylaminopropyl) - 4 - (5-nitro-2-thiazolyl)piperazine.
6. The compound 1-(3-dimethylaminopropyl) - 4 - (2-pyridyl)piperazine.
7. The compound 1-(3-dimethylaminopropyl) - 4 - (2-quinolyl)piperazine.
8. The compound 1-(2-benzoxazolyl)-4-(3 - dimethylaminopropyl)piperazine.
9. The compound 1-(2-benzothiazolyl)-4-(3-dimethylaminopropyl)piperazine.
10. The compound 1-(3-dimethylaminopropyl) - 4 - (4-pyridyl)piperazine.
11. The compound 1-(3-dimethylaminopropyl) - 4 - (6-methoxy-4-quinolyl)piperazine.
12. The compound 1-(3-dimethylaminopropyl) - 4 - (2-thiazolyl)piperazine.

13. The compound 1-(2-benzothiazolyl)-trans-2,5-dimethyl-4-(3-dimethylaminopropyl)piperazine.

14. The compound 1-(7-chloro-4-quinolyl)piperazine.

15. The compound 1-(3-dimethylaminopropyl)-4-(1,3,4-thiadiazol-2-yl)piperazine.

16. The compound 1-(3-dimethylaminopropyl)-4-(4-quinolyl-1-oxide)piperazine.

17. The compound 1-(5-benzamido-2-pyridyl)-4-(3-dimethylaminopropyl)piperazine.

References Cited

UNITED STATES PATENTS

| | | | |
|---|---|---|---|
| 2,513,026 | 6/1950 | Jacob et al. | 260—268 |
| 2,562,036 | 7/1951 | Hultquist et al. | 260—268 |
| 2,794,804 | 6/1957 | Kushnar et al. | 260—268 |
| 2,861,072 | 11/1958 | Weston et al. | 260—268 |
| 3,015,657 | 1/1962 | Geschickter et al. | 260—268 |
| 3,030,366 | 4/1962 | Biel | 260—268 |
| 3,098,066 | 7/1963 | Mall | 260—268 X |
| 3,184,382 | 5/1965 | Calandra | 167—65 |
| 3,190,883 | 6/1965 | Geschickter et al. | 260—268 |
| 3,219,528 | 11/1965 | Thominet et al. | 167—65 |

FOREIGN PATENTS 2,949,431  8/1960  Great Britain.

OTHER REFERENCES

Mull et al., Journal of Medicinal and Pharmaceutical Chemistry, vol. 5, No. 5, pp. 651–4, September 1962.

ALEX MAZEL, *Primary Examiner.*

HENRY R. JILES, *Examiner.*

JAMES W. ADAMS, JR., *Assistant Examiner.*